United States Patent [19] [11] 3,796,900
McNab [45] Mar. 12, 1974

[54] CURRENT TRANSFER IN HOMOPOLAR MACHINES

[75] Inventor: Ian Roderick McNab, Newcastle upon Tyne, England

[73] Assignee: International Research & Development Company, Limited, Fossway, Newcastle upon Tyne, England

[22] Filed: Mar. 15, 1972

[21] Appl. No.: 234,979

Related U.S. Application Data

[63] Continuation of Ser. Nos. 64,997, Aug. 19, 1970, Pat. No. 3,681,633, and Ser. No. 97,163, Dec. 11, 1970, abandoned.

[52] U.S. Cl. .............................................. 310/178
[51] Int. Cl. ........................................... H02k 31/00
[58] Field of Search ............ 310/178, 219, 243, 228, 310/231, 232

[56] References Cited
UNITED STATES PATENTS

| | | | |
|---|---|---|---|
| 2,832,909 | 4/1958 | Brill | 310/219 |
| 3,191,082 | 6/1965 | Csillag | 310/219 |
| 1,059,304 | 4/1913 | Ketchum | 310/228 |
| 3,431,532 | 3/1969 | Cary | 310/232 |
| 3,436,575 | 4/1969 | Harvey | 310/178 |
| 3,312,843 | 4/1967 | Krulls | 310/178 |
| 3,382,387 | 5/1968 | Marshall | 310/219 |

Primary Examiner—R. Skudy
Attorney, Agent, or Firm—Kemon, Palmer & Estabrook

[57] ABSTRACT

Current transfer in a homopolar dynamo-electric machine is effected by liquid metal which is caused to flow from the periphery of the rotor by centrifugal action and impinges on a stationary trough which provides a current transfer surface and serves to collect the liquid metal, which can then be re-circulated to the rotor. The liquid metal is sprayed from an annular distribution trough which projects from the periphery of the rotor into the collecting trough.

15 Claims, 8 Drawing Figures

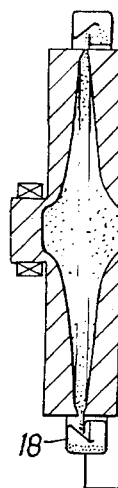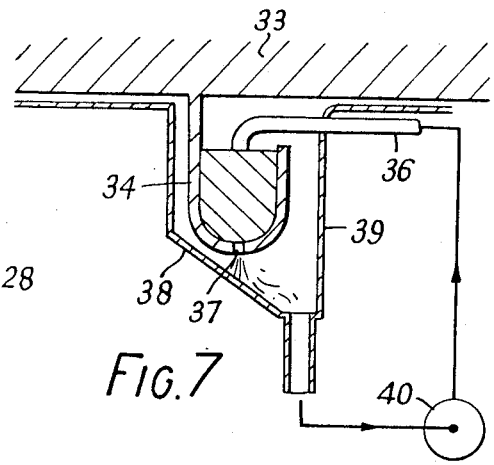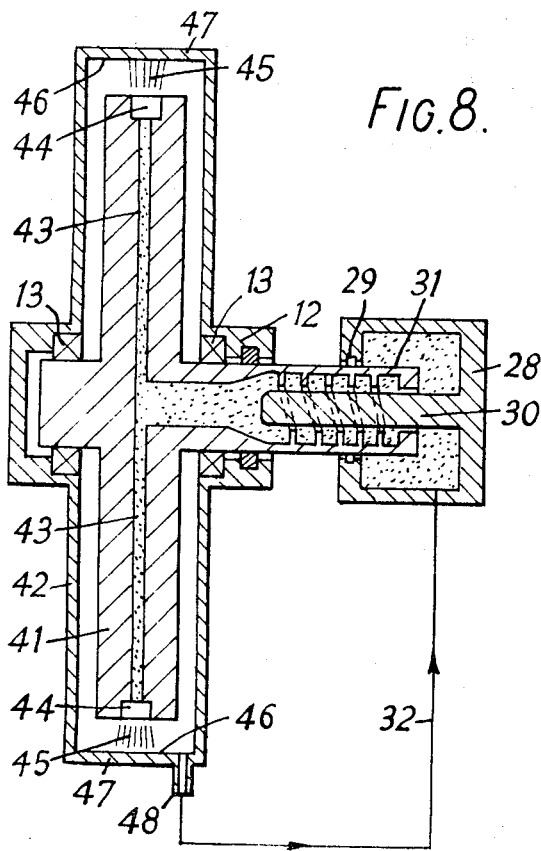

3,796,900

CURRENT TRANSFER IN HOMOPOLAR MACHINES

This invention relates to current transfer means for homopolar dynamo-electric machines.

This application is in part a continuation of my application Ser. No. 64,997 filed Aug. 19, 1970 now U.S. Pat. No. 3,681,633, for "Current Transfer in Homopolar Machines" and of my Application Ser. No. 97,163 filed Dec. 11, 1970 now abandoned for "Current Transfer Devices for Electrical Machines."

One of the factors limiting the power density obtained from homopolar machines is the method by which current is transferred from moving to static surfaces. Most conventional machines employ solid copper/carbon brushes which generally limit the surface speeds to about 10,000 ft. per minute and current densities to about 200 amp/sq. in. This limits the angular speed of the rotor and thus limits the voltage generated. A high power output therefore necessitates a high current density and a large contact surface. In general, machines of this nature employing solid brushes are limited to outputs of about 30,000 amps. and 10 volts at 3,000 r.p.m. and, although larger diameter machines operating at lower speeds would permit an increase in output, they are mainly impracticable.

Many ways of overcoming difficulties in current collection are known, involving the use of liquid metals e.g. sodium, sodium/potassium alloy, mercury, mercury amalgams and other low melting-point alloys. These methods entail the interposing of liquid metal between the rotor and the means for current collection and include methods involving discrete or sheet jets of liquid metal directed on to the rotor surface from a stationary nozzle and may also involve the use of porous metal pads through which the liquid metal is pumped.

According to the present invention there is provided a homopolar dynamo-electric machine having current transfer means comprising a stationary, annular, collecting trough coaxially surrounding the periphery of the rotor, said trough comprising a current transfer surface of electrically-conductive material, a plurality of openings in the periphery of the rotor facing said current transfer surface, conduit means in said rotor communicating with said openings, and feed means for introducing liquid metal into said conduit means in a region radially inwards of the periphery of said rotor whereby upon rotation of said rotor the liquid metal is caused to issue from said openings by the centrifugal force resulting from said rotation.

In one embodiment the rotor comprises a simple double or multiple tube arrangement with jets having a circular cross-section.

In a further embodiment the liquid metal issues from a substantially continuous circumferential slot formed in the outer periphery of the rotor to produce a sheet jet of liquid.

In a further embodiment a pumping system is employed which utilises the rotation of the rotor to pump the liquid metal into the inner region of the rotor.

In yet another embodiment the rotor has an annular distribution trough around its periphery which is open on its radially-inward side to allow for the introduction of the liquid metal from a stationary supply pipe or pipes and has the opening or openings formed in its radially-outward side. The distribution trough can lie within a collecting trough one of whose surfaces forms the current collection surface and the liquid metal can be pumped from the collecting trough back to the supply pipe or pipes.

The rotor can be constructed of electrically-insulating material and the liquid metal will then serve as the rotor conductors in which the current is generated. Preferably however the rotor is electrically conducting and the liquid metal serves primarily for current transfer at the periphery of the rotor.

The invention will now be described in more detail with reference to the accompanying drawings in which:

FIG. 6 is a cross-section of a further dynamo-electric machine in accordance with the invention with a circuit for re-circulating liquid metal, FIG. 7 is a partial cross-section of a further embodiment of the invention, and FIG. 8 is a cross-section of yet another embodiment.

FIGS. 1 and 2 show the rotor assembly and current collection arrangement for a homopolar generator. For simplicity the field coils and stator are not shown.

Figure 1:
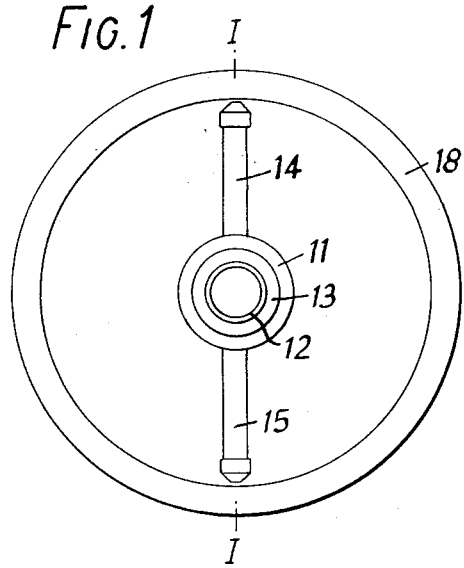
FIG. 1 is an end elevation of the rotor and current transfer means of a homopolar generator in accordance with the invention.
Figure 2:
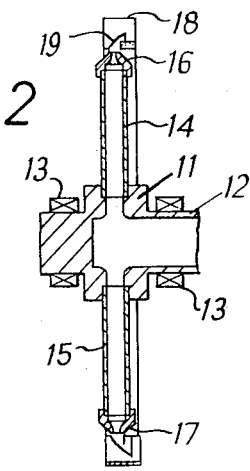
FIG. 2 is a section on I—I of the embodiment shown in FIG. 1.

The rotor comprises a composite hollow tub 11 and shaft 12 which are journalled between bearings 13. Two tubes 14 and 15 are securely attached to the hub and are fitted with conical nozzles 16 and 17. A stationary circumferential trough 18 surrounds and is spaced away from the tubes 14 and 15. The trough 18 has a deflecting inner surface 19 leading to the inside of the trough. The trough 18 also forms one current collecting member the other being a conventional brush sliding on the surface of the rotor shaft 12.

The hollow shaft 12 and hub 11 of the rotor are filled with liquid metal by any form of low pressure pump (not shown).

In operation the rotor is driven by mechanical means to rotate and cut the lines of force produced by stationary field windings, not shown, located on both sides of the rotating tubes. In accordance with a well known principle a d.c. current is produced and will be transferred to the trough 18 through the liquid metal issuing at high velocity from the conical nozzles 16 and 17 of the rotor. The liquid metal impinges upon the collector trough 18, being then deflected into the interior of the trough by the inner surface 19. The excess liquid falls to the bottom of the trough and is pumped back into the interior of the rotor by the low pressure pump.

Figure 3:
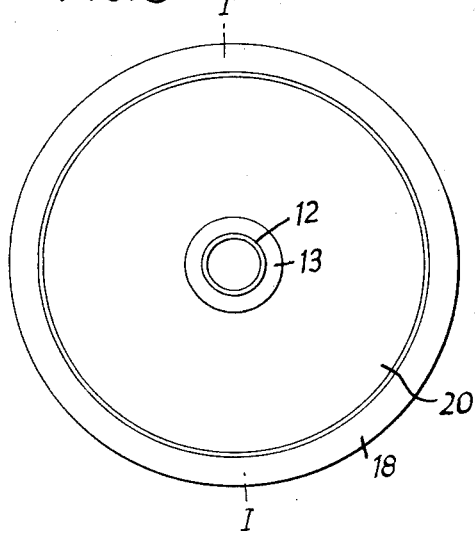
FIG. 3 is an elevation of a further embodiment of the invention.
Figure 4:
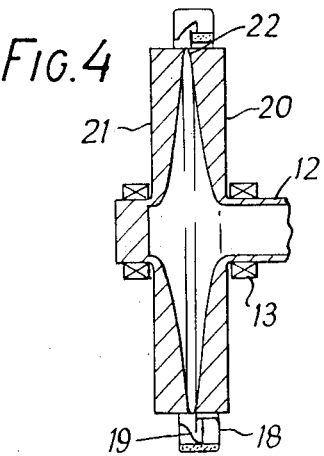
FIG. 4 is a section on I—I of the embodiment shown in FIG. 3.

FIGS. 3 and 4 show a further embodiment in which the rotor is formed in two halves 20 and 21, joined together by internal webs to form a hollow interior through which the liquid metal passes. The outer periphery of the rotor has a continuous gap or slot 22 around its circumference from which will issue a continuous sheet jet of high velocity liquid metal in the same manner as described above.

Figure 5:
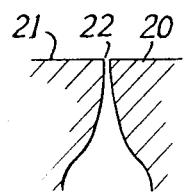
FIG. 5 shows an alternative configuration of the peripheral slot shown in FIG. 4 on a larger scale.

FIG. 5 shows an alternative form of the slot nozzle 22 formed by the rotor havles 20 and 21 by means of which the velocity of the sheet jet may be increased.

FIG. 6 shows a further embodiment having a closed cycle pumping system for pumping the liquid metal from a reservoir 28 sealed to the end of the shaft 12 by rotary seals 29. The reservoir 28 is of circular cross-section and has a plain central spigot 30 on which the shaft 12 rotates. The inside of the shaft 12 is formed with an Archimedean spiral 31 which pumps the liquid metal from the reservoir into the interior of the rotor. The collector trough 18 is connected by a conduit 32 to return the liquid metal to the reservoir. It will however be necessary to introduce some form of isolator into the connection between the trough 18 and the reservoir 28 to prevent short-circuiting of the machine. This could take the form of a mesh grating which will break the liquid metal into droplets, thus presenting a discontinuity in the current path.

In the embodiment of FIG. 7 the periphery of a rotor 33 carries an annular trough 34 which is open on its radially-inward side towards the axis 35 about whith the rotor rotates. A stationary supply or inlet pipe 36 feeds liquid metal to the trough and this liquid metal emerges from openings 37 to impinge on a current collection surface 38 forming part of an annular trough 39 which surrounds the distribution trough 34 and serves to collect the liquid metal which is then returned by a pump 40 to the inlet pipe 36. In a modification of this construction the trough 34 is disposed in a recess in the periphery of the rotor and the collecting trough 39 can be similar to the trough 18 used in other embodiments.

Further embodiments of this invention may comprise combinations of features of the embodiments described. Also the embodiment described in FIG. 1, may comprise more than two tubes, or the rotor may be a solid disc having a series of radial passages to allow the liquid metal to flow from the interior of the rotor to the outer periphery.

More particularly the embodiments of FIGS. 1 to 5 can be equipped with a circuit for re-circulation of the liquid metal from the collecting trough to the centre of the rotor having essentially the same construction as shown in FIG. 6 or FIG. 7.

It will be understood that electrical connections are made to the centre of the rotor and to the current transfer surface of the collecting trough in conventional manner so that current can flow radially through the rotor and after transfer to the trough by the current transfer means of the invention can then flow in an external circuit. While the embodiments described are homopolar generators which require a mechanical drive to the rotor in order to generate current in the external circuit, it is of course possible to operate the machines as motors by supplying current to the rotor, which will then rotate in the magnetic field provided by the stator coils. In the case of operation as a motor, provision must be made for circulating the liquid metal when the machine is started up either by means of an auxiliary pump or by rotating the rotor until the motor action is established. However, while running as a motor the machine maintains the flow of liquid metal to the current transfer surface from the openings in the periphery of the rotor by centrifugal action. In operation as a generator the rotation of the rotor always produces the required flow of liquid metal radially of the rotor by centrifugal action.

The machine shown in FIG. 8 resembles that of FIG. 6 in several respects and corresponding elements in the two figures are given the same reference numerals. Further description of these elements will therefore not be necessary. In FIG. 8 a rotor disc 41 of electrically conductive material is mounted on a hollow shaft 12 carried in bearings 13 in a stationary housing 42 which surrounds the rotor 41. Liquid metal supplied to the centre of the rotor disc 41 through the hollow shaft 12 flows under centrifugal forces through radial bores 43 to openings 44 in the periphery of the disc 41. Mounted over the openings 44 in flow communication therewith are brushes 45 each formed by an array of carbon fibres. The fibres of the brushes 45 may be coated with a conductive metal. The fibres extend in alignment with the bores 43 and the liquid metal flowing through the bores 43 and emerging from the openings 44 by centrifugal action continues to flow radially outwards between the fibres of the brush which act to support the jet of liquid metal. The brushes 45 engage on current transfer surface 46 of a collecting trough 47 forming part of the housing 42. The brushes 45 thus share with the jets of liquid metal from the openings 44 the function of transferring current between the rotor and the trough 47. Electrical connections (not shown) are made to the trough 47 in conventional manner and to the rotor shaft 12 by means of conventional brushes. The liquid metal collecting in the trough 47 runs to a drain outlet 48 from which it is returned by the conduit 32 to the reservoir 28.

I claim:

1. In a homopolar dynamo-electric machine, current transfer means comprising a stationary, annular, collecting trough coaxially surrounding the periphery of the rotor, said trough comprising a current transfer surface of electrically-conductive material, a plurality of openings extending through the periphery of the rotor facing said current transfer surface, conduit means interiorly in said rotor disposed and communicating with said openings, and feed means for introducing liquid metal into said conduit means in a region radially inwards of the periphery of said rotor whereby upon rotation of said rotor the liquid metal is caused to issue from said openings by the centrifugal force resulting from said rotation.

2. Current transfer means as claimed in claim 1 in which said feed means comprises a circuit connecting said collecting trough to said conduit means for the flow of liquid metal from the trough to the conduit means.

3. Current transfer means as claimed in claim 2 in which said circuit includes a pump.

4. Current transfer means as claimed in claim 3 in which said pump is driven by said rotor.

5. Current transfer means as claimed in claim 4 in which said pump comprises a fixed spigot and an Archimedean spiral formed within said rotor shaft and surrounding said spigot.

6. Current transfer means as claimed in claim 1 in which said conduit means in said rotor comprises radially-extending tubes and nozzles at the outer ends of the tubes defining the said openings.

7. Current transfer means as claimed in claim 1 in which the said opening is in the form of a substantially continuous peripheral slot whereby the liquid metal forms a sheet jet.

8. A homopolar machine as claimed in claim 1 wherein the conduit means includes an annular distribution trough open on its radially-inward side, said openings being formed in the radially-outward side of said distribution trough and said feed means comprising at least one stationary supply pipe feeding into the radially-inward side of said distribution trough.

9. A homopolar machine as claimed in claim 8 in which the distribution trough is located within the collecting trough.

10. A homopolar machine as claimed in claim 9 having a pump for drawing liquid metal from the collecting trough and feeding it to the supply pipe.

11. A homopolar machine as claimed in claim 1 in which the said region into which liquid metal is introduced is a central region of the rotor and the rotor is formed to act as a pump for pumping the liquid metal to the said central region.

12. A homopolar machine as claimed in claim 1 having contact brushes mounted over said openings whereby the liquid metal emerging from said openings flows through said brushes by centrifugal action, said brushes engaging said current transfer surface.

13. A homopolar machine as claimed in claim 12 in which said brushes are composed of metal-coated carbon fibres.

14. A homopolar machine as claimed in claim 12 wherein said collecting trough forms part of a stationary housing surrounding said rotor.

15. A homopolar machine as claimed in claim 12 comprising a reservoir, a circuit for the flow of liquid metal from said collecting trough to said reservoir, and pump means driven by said rotor and connected between said reservoir and said conduit means in said rotor.

* * * * *

UNITED STATES PATENT OFFICE
CERTIFICATE OF CORRECTION

Patent No. 3,796,900                  Dated May 1, 1974

Inventor(s) Ian Roderick McNab

It is certified that error appears in the above-identified patent and that said Letters Patent are hereby corrected as shown below:

[30]  Foreign Application Priority Data

December 16, 1969   Great Britain ....... 61309/69

Signed and sealed this 24th day of September 1974.

(SEAL)
Attest:

McCOY M. GIBSON JR.                C. MARSHALL DANN
Attesting Officer                  Commissioner of Patents

UNITED STATES PATENT OFFICE
CERTIFICATE OF CORRECTION

PATENT NO. : 3,796,900
DATED : March 12, 1974
INVENTOR(S) : IAN RODERICK McNAB

It is certified that error appears in the above-identified patent and that said Letters Patent are hereby corrected as shown below:

[30]  Foreign Application Priority Data

December 16, 1969    Great Britain.........61309/69

Signed and Sealed this eighteenth Day of November 1975

[SEAL]

Attest:

RUTH C. MASON
Attesting Officer

C. MARSHALL DANN
Commissioner of Patents and Trademarks